March 8, 1966 J. E. BROEZE ETAL 3,239,283
LOW FRICTION BEARING
Filed Oct. 20, 1961 2 Sheets-Sheet 1
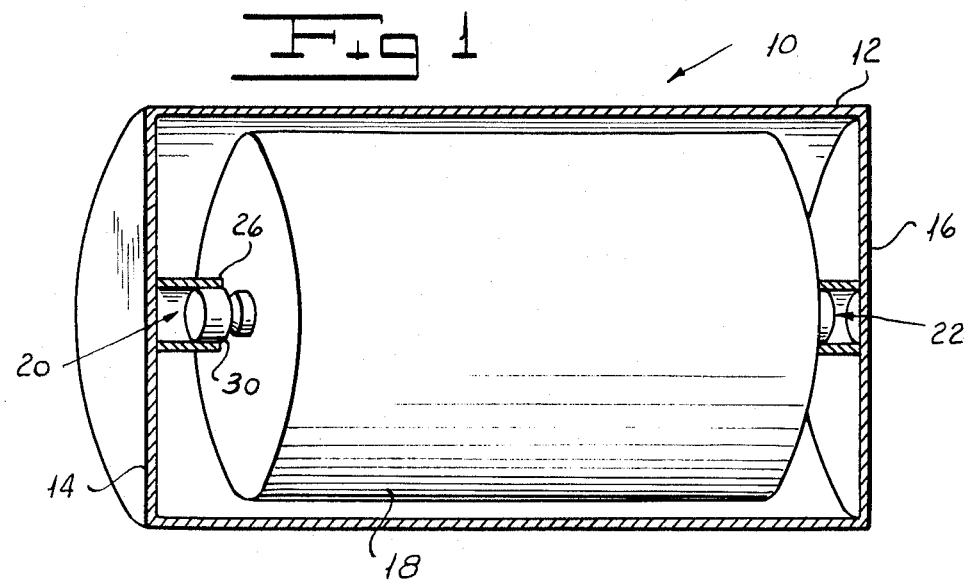
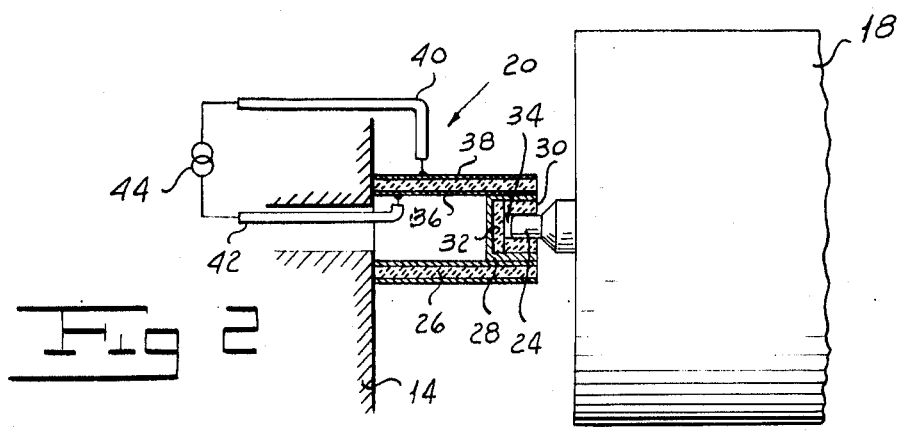
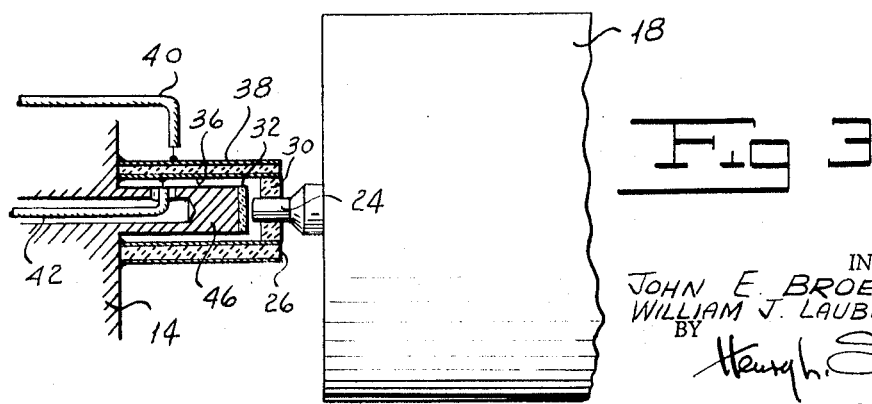
INVENTORS
JOHN E. BROEZE
WILLIAM J. LAUBENDORFER
BY
Henry L. Shenier
ATTORNEY March 8, 1966  J. E. BROEZE ETAL  3,239,283
LOW FRICTION BEARING Filed Oct. 20, 1961  2 Sheets-Sheet 2

INVENTORS
JOHN E. BROEZE
WILLIAM J. LAUBENDORFER
BY
Henry L. Shenier
ATTORNEY

United States Patent Office

3,239,283
Patented Mar. 8, 1966

3,239,283
LOW FRICTION BEARING
John E. Broeze, Valhalla, N.Y., and William J. Laubendorfer, Fairfield, Conn., assignors to United Aircraft Corporation, East Hartford, Conn., a corporation of Delaware
Filed Oct. 20, 1961, Ser. No. 146,509
3 Claims. (Cl. 308—9)

Our invention relates to a low friction bearing and more particularly to an improved bearing, for use on sensitive instruments, in which the effect of static friction is reduced.

The accuracy of many sensitive instruments such, for example, as floated gyros, floated pendulous integrating and non-integrating accelerometers and the like is deleteriously affected by the presence of static friction in the pivot-and-jewel bearings which support the sensitive element of the instrument.

It has been suggested in the prior art that the effect of static friction on a bearing could be reduced by producing constant relative movement between elements of the bearing. For example, one ring of a ball bearing has been continuously oscillated or rotated with respect to the other ring of the bearing to overcome the effect of static friction. Various systems for producing this relative motion have been suggested. In some cases a motor driven linkage is actuated to produce relative motion. In other devices an electromagnetic drive motor has been employed to produce the movement.

All of the systems of the prior art for overcoming the effect of static friction have the inherent defect that they are heavy and cumbersome for the result achieved thereby. In applications such as on missiles and the like where size and weight are primary considerations these static friction reducing systems of the prior art have not proved to be practicable.

We have invented a low friction bearing in which the effect of static friction is overcome by reciprocating the bearing elements with respect to each other along the axis of rotation of the bearing. Our low friction bearing is extremely small and light for the result achieved. It is especially adapted for use on sensitive instruments employing pivot-and-jewel bearings. It is particularly useful in reducing undesirable effects of the cross-coupling acceleration associated with the floated pendulous accelerometer. Our bearing has the added effect of enhancing the lubrication of bearings in instruments in which the bearing is immersed in a liquid.

One object of our invention is to provide a low friction bearing in which the effect of static friction on the bearing characteristic is overcome.

A further object of our invention is to provide a low friction bearing which overcomes the defects of bearings of the prior art provided with means for reducing the effect of static friction.

Another object of our invention is to provide a low friction bearing which is especially adapted for use on sensitive instruments employing pivot-and-jewel bearings.

Still another object of our invention is to provide a low friction bearing which is extremely compact and light for the result achieved thereby.

A still further object of our invention is to provide a low friction bearing which enhances lubrication in an installation in which the bearing is immersed in a liquid.

Other and further objects of our invention will appear from the following description.

In general our invention contemplates the provision of a low friction bearing in which alternating current is applied to a bearing support formed of piezoelectric material to reciprocate the bearing jewel with reference to the pivot of the sensitive element of an instrument to reduce the effect of static friction on the instrument output. In use in an installation in which our bearing is immersed in a liquid it produces a pumping action which forces the liquid into the space between the jewel and the pivot.

In the accompanying drawings which form part of the instant specification and which are to be read in conjunction therewith and in which like reference numerals are used to indicate like parts in the various views:

FIGURE 1 is a perspective view of a floated gyroscope with which our low friction bearing is especially adapted to be used.

FIGURE 2 is a sectional view of one of the bearings of the instrument shown in FIGURE 1 illustrating one form of our low friction bearing.

FIGURE 3 is a sectional view illustrating the use of an alternate form of our low friction bearing.

Figure 4:
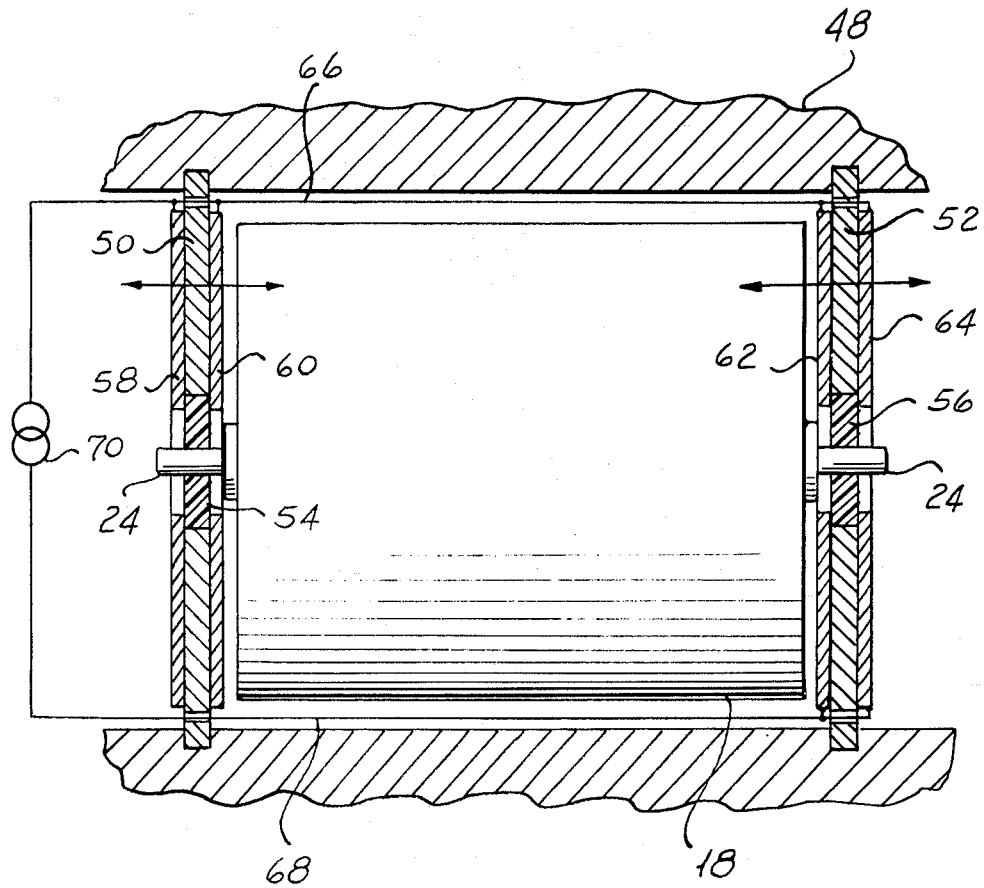
FIGURE 4 is a sectional view of an alternate form of our low friction bearing.

Referring now to FIGURE 1 we have shown a floated gyroscope indicated generally by the reference character 10 with which our low friction bearing can be used. As is known in the art the gyroscope 10 has a housing 12 provided with a pair of end plates 14 and 16 which house the gyroscope float 18. We have shown the float 18 as being supported for rotation about an axis by a pair of our low friction bearings indicated generally by the respective reference characters 20 and 22.

For purposes of simplicity we have merely shown the float 18 and the housing 12 together with our improved bearings 20 and 22 for supporting the float 18. It will be readily appreciated that the gyroscope 10 includes a reservoir from which liquid is supplied to the space between the housing 12 and float 18 as well as a suitable pick-off and torquing means.

Referring now to FIGURE 2 we have shown one of our low friction bearings such, for example, as the bearing 20 in detail. The float 18 carries a pivot pin 24 adapted to be received in the bearing 20. We secure a bearing receptacle 26 formed from a suitable tubular piezoelectric ceramic such, for example, as barium titanate to the plate 14 of housing 12 at a position at which it is adapted to receive pin 24. This may be accomplished by any suitable means such as by the use of a suitable bonding agent which holds the ceramic in position on the end plate. The receptacle 26 is adapted to receive a jewel bearing assembly including a jewel holder 28 bonded to the inside of the receptacle 26. The holder 28 carries a ring 20 formed of a suitable bearing material such, for example, as sapphire and an end stone 32 which may also be formed from sapphire. When the float 18 is assembled in its bearings in the normal position thereof there is some clearance between the end of the pin 24 and the end stone 32 so that a small space 34 exists.

As is known in the art if a suitable electrical potential is applied to piezoelectric material a strain results to change the dimensions of the material. We provide the respective inner and outer surfaces of the cylindrical receptacle 26 with films or coatings 36 and 38 of conductive material. Lead wires 40 and 42 provide electrical connections from a suitable source 44 of alternating current potential to the films 36 and 38 thus to apply the potential to the ceramic receptacle. We so polarize the material of which receptacle 26 is formed that the length of the tube changes dimension in response to the potential of source 44. The length of the tube 26 alternately increases and decreases to produce a movement of the jewel 30 carried thereby with respect to the pivot pin 24. This constant relative motion between the pin and the jewel reduces the static friction in the assembly to a point to which its effect on the output of the system is negligible. That is, in response to the action the coefficient of friction in direction normal to the axial oscillation or reciprocation is reduced.

When an instrument such as a gyro float 18 supported in a pair of our bearings 20 and 22 is floated in a suitable liquid such, for example, as oil inside the housing 12 the action of our bearing described above enhances the lubricating effect of the fluid. This can readily be demonstrated. When oil or another suitable fluid fills the housing 12 some of the oil flows into the space 34 between the end of the pin 24 and the end stone 32. When the stone 32 reciprocates with respect to the pin 24 under the influence of the piezoelectric receptacle 26 it acts as a pump to force the liquid in the space 34 to the area between the pin 24 and the inner surface of the jewel ring 30. It will be apparent that this action serves to maintain a film of oil between pin 24 and the inner surface of jewel ring 30 to insure that the proper lubrication takes place.

Referring now to FIGURE 3 of the drawings we have shown an alternate form of our low friction bearing in which the end stone 32 is stationary relative to the jewel ring 30. In this form of our invention the plate 14 is provided with a cylindrical extension 46 disposed within the tube 26. We secure the end stone 32 to the end of extension 46 by any suitable bonding agent in a position adjacent the end of pin 24. The action of this form of our invention is substantially the same as that shown in FIGURE 2 with the exception that end stone 32 does not move and the jewel ring 30 moves with respect to the end stone 32.

Referring now to FIGURE 4 we have shown a further form of our invention in which the rotor 18 having the shafts 24 is carried by a frame 48. Frame 48 receives respective support plates 50 and 52 which receive bearings 54 and 56 in which we dispose shafts 24.

Plate 50 carries respective annular piezoelectric elements 58 and 60 while plate 52 carries elements 62 and 64. Respective conductors 66 and 68 connect a source 70 of alternating current voltage to the elements 58, 60, 62, and 64. In response to the application of this voltage the elements reciprocate or vibrate the bearings 54 and 56 in a direction along the axis of shafts 24.

In orperation of our low friction bearing to support a gyroscope float 18, for example, we assemble the float within the housing 12 with its pivot pins 24 disposed within the jewel rings 30 of the bearings 20 and 22. When this has been done and when the system is to operate, we apply a suitable alternating current such, for example, as the current from source 44 to the ceramic cylinder 26 through the medium of the conductive plates or coatings 36 and 38. The ceramic material is so polarized that in response to the alternating potential it alternately contracts and expands to move the jewel ring in an axial direction with respect to the pivot pins 24. This continuous reciprocation of the jewel ring reduces the static friction to a point at which its effect is negligible. Where the assembly such as a gyro float is immersed in a liquid our bearing produces the additional action of pumping fluid from the space 34 to the area between the pivot pin 24 and the jewel ring 30 to insure that there is a film of the liquid such as oil between the pin and the bearing surface of the jewel. The operation of the form of our invention shown in FIGURE 3 is substantially the same as that of the form of the invention illustrated in FIGURE 2 except that the end stone 32 is fixed. FIGURE 4 illustrates a form of our low friction bearing which operates in a manner substantially the same as does that of the form of our invention shown in FIGURE 1.

It will be seen that we have accomplished the objects of our invention. We have invented a bearing in which the effect of static friction is negligible. Our bearing overcomes the defects of bearings of the prior art designed to overcome the effect of static friction. Our improved bearing is simple and compact for the result achieved. It is particularly useful in reducing the undesirable effects of cross-coupling acceleration associated with floated pendulous accelerometers. Where it is used in an instrument having a float sensitive element, it enhances the lubrication of the bearings which support the sensitive element.

It will be understood that certain features and sub-combinations are of utility and may be employed without reference to other features and sub-combinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A low friction bearing including in combination a hollow cylindrical support formed of piezoelectric material, a jewel bearing and an end stone carried by said support, a bearing pin supported by said jewel bearing for rotation around an axis and means for applying an alternating voltage to said piezoelectric material to reciprocate said jewel bearing and said end stone with respect to said pin.

2. A low friction bearing including in combination a stationary member, a generally cylindrical support formed of piezoelectric material carried by said member, conductive films carried by the inner and outer surfaces of said support, a jewel bearing carried by said annular support, an end stone carried by said member, a shaft disposed in said jewel bearing for rotation around an axis and means for applying an alternating voltage to said conductive films to cause said piezoelectric support to reciprocate said jewel bearing with respect to said shaft in the direction of said axis.

3. A low friction bearing including in combination a generally cylindrical support formed of piezoelectric material, conductive films carried by the inner and outer surfaces of said support, means forming a bearing surface carried by said support, a member supported by said surface for rotation around an axis and means for applying an alternating voltage to said conductive films to cause said piezoelectric support to reciprocate said bearing surface with respect to said member in the direction of said axis.

References Cited by the Examiner

UNITED STATES PATENTS

| | | | |
|---|---|---|---|
| 625,826 | 5/1899 | Buck | 310—229 |
| 1,067,864 | 7/1913 | Christians | 310—229 |
| 1,975,646 | 10/1934 | Luthy | 308—159 |
| 2,044,000 | 6/1936 | Heising | 310—8.7 |
| 2,185,664 | 1/1940 | Harry | 308—41 |
| 2,278,966 | 4/1942 | Williams | 308—1 |
| 2,993,739 | 7/1961 | Hall | 308—1 |
| 3,018,142 | 1/1962 | Warnock | 74—5 |
| 3,046,795 | 7/1962 | Wilkerson | 74—5 |

DON A. WAITE, *Primary Examiner.*

FRANK SUSKO, ROBERT C. RIORDON, *Examiners.*